United States Patent
Subramanian et al.

(10) Patent No.: US 12,462,323 B2
(45) Date of Patent: Nov. 4, 2025

(54) SHARED DYNAMIC BUFFER IN IMAGE SIGNAL PROCESSOR

(71) Applicant: Apple Inc., Cupertino, CA (US)

(72) Inventors: Ashwin S. Subramanian, San Jose, CA (US); Damon W Finney, San Jose, CA (US); Marc A Schaub, Sunnyvale, CA (US); Albert C Kuo, Palo Alto, CA (US); Paul S Serris, San Jose, CA (US); Richard L Schober, Cupertino, CA (US)

(*) Notice: Subject to any disclaimer, the term of this patent is extended or adjusted under 35 U.S.C. 154(b) by 802 days.

(21) Appl. No.: 17/694,670

(22) Filed: Mar. 15, 2022

(65) Prior Publication Data

US 2023/0298124 A1    Sep. 21, 2023

(51) Int. Cl.
| | |
|---|---|
| G06T 1/20 | (2006.01) |
| G06F 13/28 | (2006.01) |
| G06F 13/40 | (2006.01) |
| G06T 1/60 | (2006.01) |
| H04N 19/152 | (2014.01) |
| H04N 19/176 | (2014.01) |

(52) U.S. Cl.
CPC .............. G06T 1/20 (2013.01); G06F 13/28 (2013.01); G06F 13/4031 (2013.01); G06T 1/60 (2013.01); H04N 19/152 (2014.11); H04N 19/176 (2014.11); G06F 2213/2806 (2013.01)

(58) Field of Classification Search
None
See application file for complete search history.

(56) References Cited

U.S. PATENT DOCUMENTS

| | | | | |
|---|---|---|---|---|
| 7,213,087 | B1 * | 5/2007 | Bertone | H04L 47/39 710/56 |
| 7,346,067 | B2 * | 3/2008 | Chung | H04L 49/901 370/413 |
| 7,647,444 | B2 * | 1/2010 | Dignum | G06F 13/1642 710/241 |

(Continued)

FOREIGN PATENT DOCUMENTS

| | | | | |
|---|---|---|---|---|
| GB | 2605375 A | * 10/2022 | | G06F 11/30 |

OTHER PUBLICATIONS

Machine Translation of Chinese Patent CN-112837205-A, 2021. (Year: 2021).*

*Primary Examiner* — Steven G Snyder

(57) ABSTRACT

Embodiments relate to an image signal processor that includes an image processing circuit, a buffer, and a rate limiter circuit. The image processing circuit perform operations associated with image signal processing. The buffer stores the image data provided by the system memory. The buffer includes a shared that is dynamically allocated among the image processing circuits. The rate limiter circuit arbitrates allocation of the shared section. The arbitration process includes allocating data credits for the shared section to an image processing circuit. The rate limiter circuit determines a first number of blocks in the shared section that are allocated for pending requests and a second number of blocks that include data pending to be consumed by the image processing circuit. If the total allocated blocks occupied by the image processing circuit exceed a throttling threshold, the image processing circuit will be throttled by an exponential factor.

20 Claims, 7 Drawing Sheets

(56) References Cited

U.S. PATENT DOCUMENTS

| | | | | |
|---|---|---|---|---|
| 7,698,478 | B2* | 4/2010 | Wang | G06F 13/385 |
| | | | | 710/29 |
| 9,413,680 | B1* | 8/2016 | Kusters | H04M 15/7652 |
| 9,984,433 | B2* | 5/2018 | Han | G06T 11/003 |
| 10,437,758 | B1* | 10/2019 | Mathews | G06F 13/18 |
| 10,740,032 | B2* | 8/2020 | Acharya | G06F 3/0673 |
| 11,221,975 | B2* | 1/2022 | Puder | G06F 13/1668 |
| 11,663,767 | B2* | 5/2023 | Hakura | G06T 1/60 |
| | | | | 345/506 |
| 11,860,799 | B2* | 1/2024 | Agarwal | G06F 13/1668 |
| 2008/0126606 | A1* | 5/2008 | Wang | G06F 13/385 |
| | | | | 710/29 |
| 2014/0232729 | A1* | 8/2014 | Hakura | G06T 1/60 |
| | | | | 345/506 |
| 2017/0109860 | A1* | 4/2017 | Han | G06T 11/003 |
| 2018/0275923 | A1* | 9/2018 | Earhart | H04L 41/0896 |
| 2019/0163400 | A1* | 5/2019 | Acharya | G06F 3/0604 |
| 2019/0303281 | A1 | 10/2019 | Firoozshahian et al. | |
| 2020/0193554 | A1 | 6/2020 | Dodge et al. | |
| 2021/0271305 | A1 | 9/2021 | Gendler et al. | |
| 2021/0279187 | A1* | 9/2021 | Puder | G06F 13/1668 |
| 2021/0294660 | A1* | 9/2021 | Uralsky | G06F 9/5038 |
| 2024/0028400 | A1* | 1/2024 | Mora Porta | G06F 13/1663 |

* cited by examiner

SHARED DYNAMIC BUFFER IN IMAGE SIGNAL PROCESSOR

BACKGROUND

1. Field of the Disclosure

The present disclosure relates to a circuit for processing images and, more particularly, an image signal processor that uses a dynamically shared buffer.

2. Description of the Related Arts

Image data captured by an image sensor or received from other data sources is often processed in an image processing pipeline before further processing or consumption. For example, raw image data may be corrected, filtered, or otherwise modified before being provided to subsequent components such as a video encoder. To perform corrections or enhancements for captured image data, various components, unit stages or modules may be employed.

Such an image processing pipeline may be structured so that corrections or enhancements to the captured image data can be performed in an expedient way without consuming other system resources. Although many image processing algorithms may be performed by executing software programs on central processing unit (CPU), execution of such programs on the CPU would consume significant bandwidth of the CPU and other peripheral resources as well as increase power consumption. Hence, image processing pipelines are often implemented as a hardware component separate from the CPU and dedicated to performing one or more image processing algorithms.

The speed of an image processor may be bound by access speed to memory in data retrieval. In a typical image processor, multiple processing operations may be carried out simultaneously. The performance of the image processor can be correlated with the management of data retrieval.

SUMMARY

Embodiments relate to an image signal processor that includes a plurality of image processing circuits, a buffer, and a rate limiter circuit. The image processing circuits perform operations associated with image signal processing. The buffer is coupled to the image processing circuits and to a system memory. The buffer stores the image data for the exchanges between the image processing circuits and the system memory. The buffer includes a shared section dynamically allocated among the image processing circuits. The rate limiter circuit is coupled to the one or more image processing circuits. The rate limiter circuit arbitrates allocation of the shared section among the image processing circuits. The arbitration process includes allocating data credits for the shared section to one of the image processing circuits. The arbitration process also includes determining total allocated blocks for the shared section to the one of the image processing circuits. The total allocated blocks include a first number of blocks allocated for pending requests made by the one of the image processing circuits and a second number of blocks pending consumption by the one of the image processing circuits. The arbitration process further includes reducing or preventing allocation of additional data credits to the one of the image processing circuits for at least a duration responsive to determining that the total allocated blocks exceed the throttling threshold.

The figures depict and the detail description describes various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to an image signal processor that include a buffer that is dynamically allocated among multiple pixel pipelines. The allocation of the buffer is arbitrated by a rate limiter circuit, which detects the buffer blocks that are allocated to a pixel pipeline. The total allocated blocks includes a first number of blocks that are reserved for data to be fetched from system memory and a second number of blocks that store data that are pending to be consumed by the pixel pipeline. In response to the total allocated blocks exceeding a throttling threshold, the allocation of data credits to the pixel pipeline is reduced by an exponential factor.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, California. Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

Figure 1:
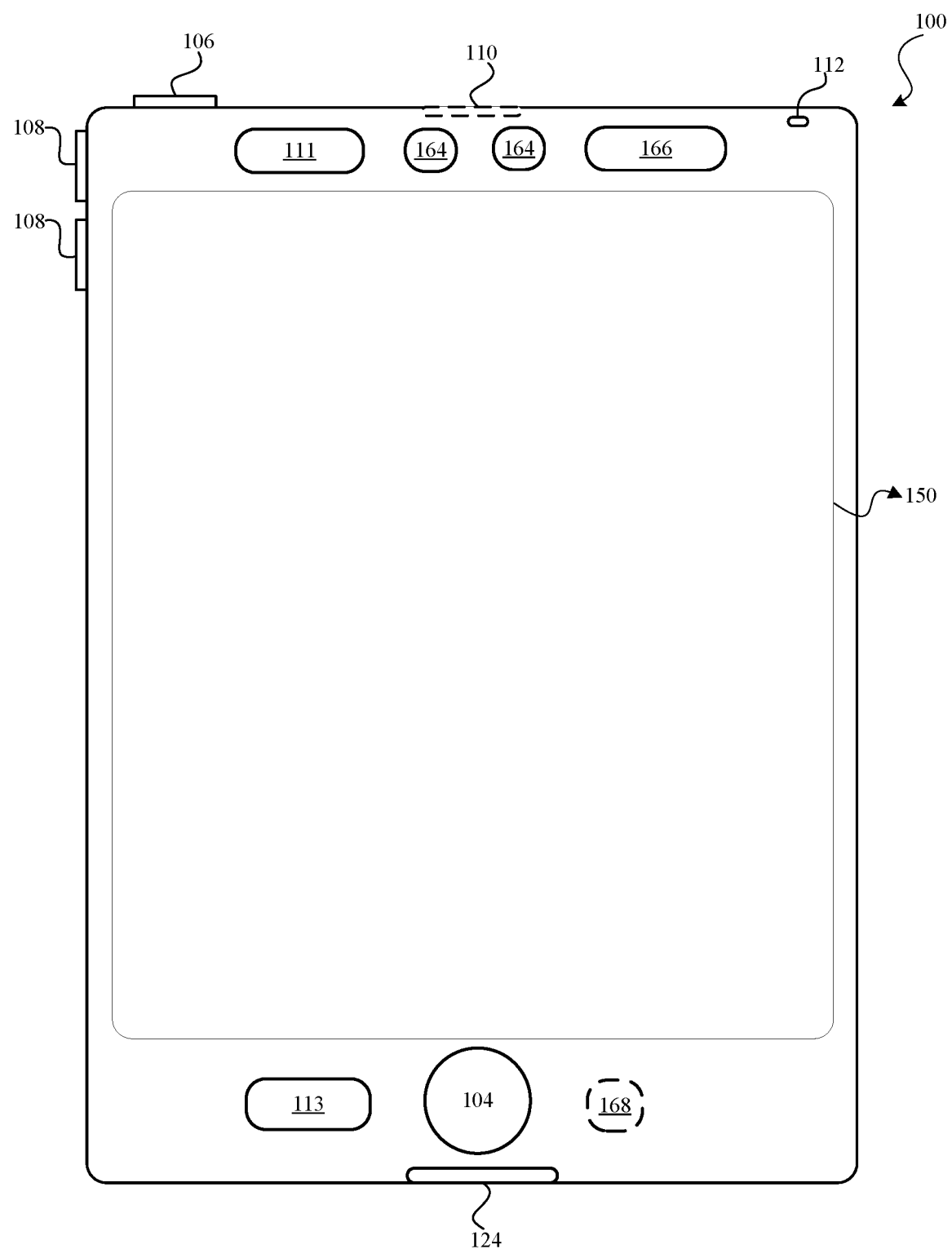
FIG. 1 is a high-level diagram of an electronic device, according to one embodiment

Figure (FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. The device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. Device 100 may include more than one type of image sensors 164. Each type may include more than one image sensor 164. For example, one type of image sensors 164 may be cameras and another type of image sensors 164 may be infrared sensors that may be used for face recognition. In addition or alternatively, the image sensors 164 may be associated with different lens configuration. For example, device 100 may include rear image sensors, one with a wide-angle lens and another with as a telephoto lens. The device 100 may include components not shown in FIG. 1 such as an ambient light sensor, a dot projector and a flood illuminator.

Device 100 is only one example of an electronic device, and device 100 may have more or fewer components than listed above, some of which may be combined into a component or have a different configuration or arrangement. The various components of device 100 listed above are embodied in hardware, software, firmware or a combination thereof, including one or more signal processing and/or application specific integrated circuits (ASICs). While the components in FIG. 1 are shown as generally located on the same side as the touch screen 150, one or more components may also be located on an opposite side of device 100. For example, the front side of device 100 may include an infrared image sensor 164 for face recognition and another image sensor 164 as the front camera of device 100. The back side of device 100 may also include additional two image sensors 164 as the rear cameras of device 100.

Figure 2:
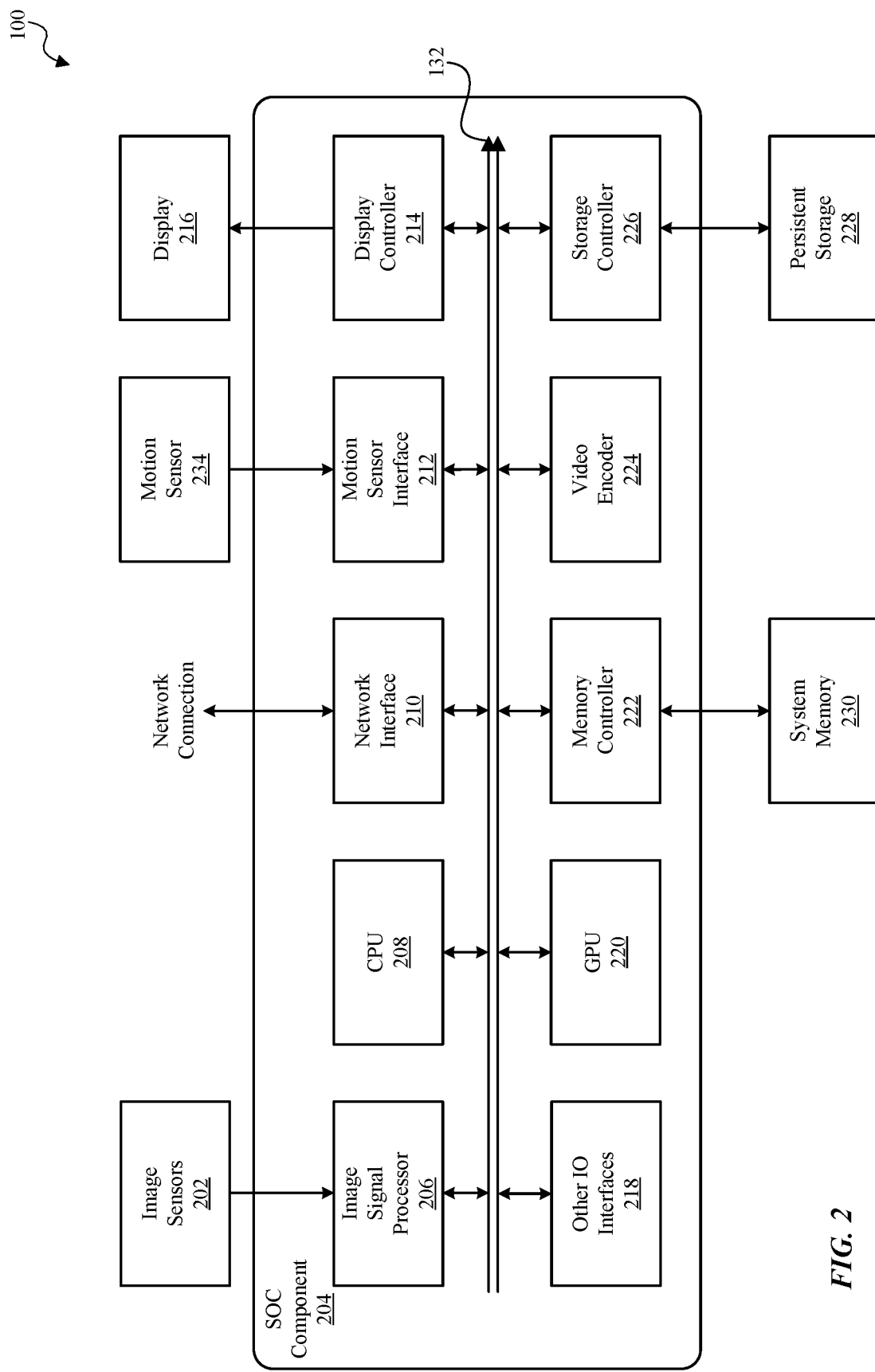
FIG. 2 is a block diagram illustrating components in the electronic device, according to one embodiment.

FIG. 2 is a block diagram illustrating components in device 100, according to one embodiment. Device 100 may perform various operations including image processing. For this and other purposes, the device 100 may include, among other components, image sensor 202, system-on-a chip (SOC) component 204, system memory 230, persistent storage (e.g., flash memory) 228, orientation sensor 234, and display 216. The components as illustrated in FIG. 2 are merely illustrative. For example, device 100 may include other components (such as speaker or microphone) that are not illustrated in FIG. 2. Further, some components (such as orientation sensor 234) may be omitted from device 100.

Image sensors 202 are components for capturing image data. Each of the image sensors 202 may be embodied, for example, as a complementary metal-oxide-semiconductor (CMOS) active-pixel sensor, a camera, video camera, or other devices. Image sensors 202 generate raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensors 202 may be in a Bayer color filter array (CFA) pattern (hereinafter also referred to as "Bayer pattern"). An image sensor 202 may also include optical and mechanical components that assist image sensing components (e.g., pixels) to capture images. The optical and mechanical components may include an aperture, a lens system, and an actuator that controls the lens position of the image sensor 202.

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof. In some embodiments, system memory 230 may store pixel data or other image data or statistics in various formats.

Persistent storage 228 is a component for storing data in a non-volatile manner. Persistent storage 228 retains data even when power is not available. Persistent storage 228 may be embodied as read-only memory (ROM), flash memory or other non-volatile random access memory devices.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, motion sensor interface 212, display controller 214, graphics processor (GPU) 220, memory controller 222, video encoder 224, storage controller 226, and various other input/output (I/O) interfaces 218, and bus 232 connecting these subcomponents. SOC component 204 may include more or fewer subcomponents than those shown in FIG. 2.

ISP 206 is hardware that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations, as described below in detail with reference to FIG. 3.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

I/O interfaces 218 are hardware, software, firmware or combinations thereof for interfacing with various input/output components in device 100. I/O components may include devices such as keypads, buttons, audio devices, and sensors such as a global positioning system. I/O interfaces 218 process data for sending data to such I/O components or process data received from such I/O components.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206, such as discussed below in FIG. 3) and display. The networks may include, but are not limited to, Local Area Networks (LANs) (e.g., an Ethernet or corporate network) and Wide Area Networks (WANs). The image data received via network interface 210 may undergo image processing processes by ISP 206.

Motion sensor interface 212 is circuitry for interfacing with motion sensor 234. Motion sensor interface 212 receives sensor information from motion sensor 234 and processes the sensor information to determine the orientation or movement of the device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 128 or for passing the data to network interface w10 for transmission over a network to another device.

In some embodiments, one or more subcomponents of SOC component 204 or some functionality of these subcomponents may be performed by software components executed on ISP 206, CPU 208 or GPU 220. Such software components may be stored in system memory 230, persistent storage 228 or another device communicating with device 100 via network interface 210.

Image data or video data may flow through various data paths within SOC component 204. In one example, raw image data may be generated from the image sensors 202 and processed by ISP 206, and then sent to system memory 230 via bus 232 and memory controller 222. After the image data is stored in system memory 230, it may be accessed by video encoder 224 for encoding or by display 116 for displaying via bus 232.

In another example, image data is received from sources other than the image sensors 202. For example, video data may be streamed, downloaded, or otherwise communicated to the SOC component 204 via wired or wireless network. The image data may be received via network interface 210 and written to system memory 230 via memory controller 222. The image data may then be obtained by ISP 206 from system memory 230 and processed through one or more image processing pipeline stages, as described below in detail with reference to FIG. 3. The image data may then be returned to system memory 230 or be sent to video encoder 224, display controller 214 (for display on display 216), or storage controller 226 for storage at persistent storage 228.

Example Image Signal Processing Pipelines

Figure 3:
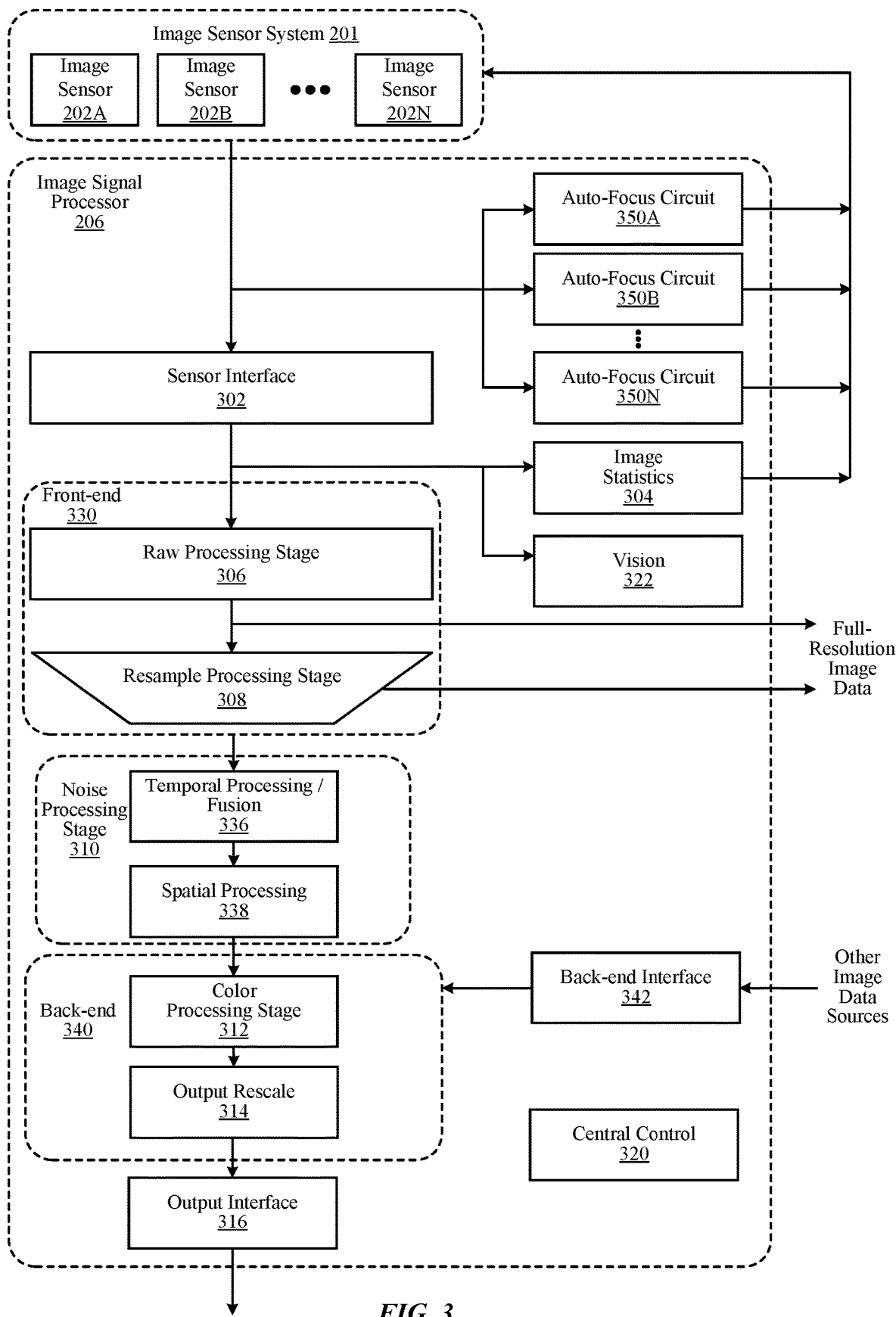
FIG. 3 is a block diagram illustrating image processing pipelines implemented using an image signal processor, according to one embodiment.

FIG. 3 is a block diagram illustrating image processing pipelines implemented using ISP 206, according to one embodiment. In the embodiment of FIG. 3, ISP 206 is coupled to an image sensor system 201 that includes one or more image sensors 202A through 202N (hereinafter collectively referred to as "image sensors 202" or also referred individually as "image sensor 202") to receive raw image data. The image sensor system 201 may include one or more sub-systems that control the image sensors 202 individually. In some cases, each image sensor 202 may operate independently while, in other cases, the image sensors 202 may share some components. For example, in one embodiment, two or more image sensors 202 may be share the same circuit board that controls the mechanical components of the image sensors (e.g., actuators that change the lens positions of each image sensor). The image sensing components of an image sensor 202 may include different types of image sensing components that may provide raw image data in different forms to the ISP 206. For example, in one embodiment, the image sensing components may include a plurality of focus pixels that are used for auto-focusing and a plurality of image pixels that are used for capturing images. In another embodiment, the image sensing pixels may be used for both auto-focusing and image capturing purposes.

ISP 206 implements an image processing pipeline which may include a set of stages that process image information from creation, capture or receipt to output. ISP 206 may include, among other components, sensor interface 302, central control 320, front-end pipeline stages 330, noise-processing stage 310, back-end pipeline stages 340, image statistics module 304, vision module 322, back-end interface 342, output interface 316, and auto-focus circuits 350A through 350N (hereinafter collectively referred to as "auto-focus circuits 350" or referred individually as "auto-focus circuits 350"). ISP 206 may include other components not illustrated in FIG. 3 or may omit one or more components illustrated in FIG. 3.

In one or more embodiments, different components of ISP 206 process image data at different rates. In the embodiment of FIG. 3, front-end pipeline stages 330 (e.g., raw processing stage 306 and resample processing stage 308) may process image data at an initial rate. Thus, the various different techniques, adjustments, modifications, or other processing operations performed by these front-end pipeline stages 330 at the initial rate. For example, if the front-end pipeline stages 330 process 2 pixels per clock cycle, then raw processing stage 306 operations (e.g., black level compensation, highlight recovery and defective pixel correction) may process 2 pixels of image data at a time. In contrast, one or more of the noise processing stage 310 and/or back-end pipeline stages 340 may process image data at a different rate less than the initial data rate. For example, in the embodiment of FIG. 3, back-end pipeline stages 340 (e.g., color processing stage 312, and output rescale 314) may be processed at a reduced rate (e.g., 1 pixel per clock cycle).

Raw image data captured by image sensors 202 may be transmitted to different components of ISP 206 in different manners. In one embodiment, raw image data corresponding to the focus pixels may be sent to the auto-focus circuits 350 while raw image data corresponding to the image pixels may be sent to the sensor interface 302. In another embodiment, raw image data corresponding to both types of pixels may simultaneously be sent to both the auto-focus circuits 350 and the sensor interface 302.

Auto-focus circuits 350 may include hardware circuit that analyzes raw image data to determine an appropriate lens position of each image sensor 202. In one embodiment, the raw image data may include data that is transmitted from image sensing pixels that specializes in image focusing. In another embodiment, raw image data from image capture pixels may also be used for auto-focusing purpose. An auto-focus circuit 350 may perform various image processing operations to generate data that determines the appropriate lens position. The image processing operations may include cropping, binning, image compensation, scaling to generate data that is used for auto-focusing purpose. The auto-focusing data generated by auto-focus circuits 350 may be fed back to the image sensor system 201 to control the lens positions of the image sensors 202. For example, an image sensor 202 may include a control circuit that analyzes the auto-focusing data to determine a command signal that is sent to an actuator associated with the lens system of the image sensor to change the lens position of the image sensor. The data generated by the auto-focus circuits 350 may also be sent to other components of the ISP 206 for other image processing purposes. For example, some of the data may be sent to image statistics 304 to determine information regarding auto-exposure.

The auto-focus circuits 350 may be individual circuits that are separate from other components such as image statistics 304, sensor interface 302, front-end stages 330, noise processing stage 310, and back-end stages 340. This allows the ISP 206 to perform auto-focusing analysis independent of other image processing pipelines. For example, the ISP 206 may analyze raw image data from the image sensor 202A to adjust the lens position of image sensor 202A using the auto-focus circuit 350A while performing downstream image processing of the image data from image sensor 202B simultaneously. In one embodiment, the number of auto-focus circuits 350 may correspond to the number of image sensors 202. In other words, each image sensor 202 may have a corresponding auto-focus circuit that is dedicated to the auto-focusing of the image sensor 202. The device 100 may perform auto focusing for different image sensors 202 even if one or more image sensors 202 are not in active use. This allows a seamless transition between two image sensors 202 when the device 100 switches from one image sensor 202 to another. For example, in one embodiment, a device 100 may include a wide-angle camera and a telephoto camera as a dual back camera system for photo and image processing. The device 100 may display images captured by one of the dual cameras and may switch between the two cameras from time to time. The displayed images may seamless transition from image data captured by one image sensor 202 to image data captured by another image sensor 202 without waiting for the second image sensor 202 to adjust its lens position because two or more auto-focus circuits 350 may continuously provide auto-focus data to the image sensor system 201.

Raw image data captured by different image sensors 202 may also be transmitted to sensor interface 302. Sensor interface 302 receives raw image data from image sensor 202 and processes the raw image data into an image data processable by other stages in the pipeline. Sensor interface 302 may perform various preprocessing operations, such as image cropping, binning or scaling to reduce image data size. In some embodiments, pixels are sent from the image sensor 202 to sensor interface 302 in raster order (e.g., horizontally, line by line). The subsequent processes in the pipeline may also be performed in raster order and the result may also be output in raster order. Although only a single image sensor and a single sensor interface 302 are illustrated in FIG. 3, when more than one image sensor is provided in device 100, a corresponding number of sensor interfaces may be provided in ISP 206 to process raw image data from each image sensor.

Front-end pipeline stages 330 process image data in raw or full-color domains. Front-end pipeline stages 330 may include, but are not limited to, raw processing stage 306 and resample processing stage 308. A raw image data may be in Bayer raw format or Quad Bayer raw format, for example. In Bayer raw image format or Quad Bayer raw format, pixel data with values specific to a particular color (instead of all colors) is provided in each pixel. In an image capturing sensor, image data is typically provided in a Bayer pattern or a Quad Bayer pattern. Raw processing stage 306 may process image data in a Bayer raw format or Quad Bayer raw format.

The operations performed by raw processing stage 306 include, but are not limited, sensor linearization, black level compensation, fixed pattern noise reduction, defective pixel correction, raw noise filtering, lens shading correction, white balance gain, and highlight recovery. Sensor linearization refers to mapping nonlinear image data to linear space for other processing. Black level compensation refers to providing digital gain, offset and clip independently for each color component (e.g., Gr, R, B, Gb) of the image data. Fixed pattern noise reduction refers to removing offset fixed pattern noise and gain fixed pattern noise by subtracting a dark frame from an input image and multiplying different gains to pixels. Defective pixel correction refers to detecting defective pixels, and then replacing defective pixel values. Raw noise filtering refers to reducing noise of image data by averaging neighbor pixels that are similar in brightness. Highlight recovery refers to estimating pixel values for those pixels that are clipped (or nearly clipped) from other channels. Lens shading correction refers to applying a gain per pixel to compensate for a dropoff in intensity roughly proportional to a distance from a lens optical center. White balance gain refers to providing digital gains for white balance, offset and clip independently for all color components (e.g., Gr, R, B, Gb in Bayer format). Components of ISP 206 may convert raw image data into image data in full-color domain, and thus, raw processing stage 306 may process image data in the full-color domain in addition to or instead of raw image data.

Resample processing stage 308 performs various operations to convert, resample, or scale image data received from raw processing stage 306. Operations performed by resample processing stage 308 may include, but not limited to, demosaic operation, per-pixel color correction operation, Gamma mapping operation, color space conversion and downscaling or sub-band splitting. Demosaic operation refers to converting or interpolating missing color samples from raw image data (for example, in a Bayer pattern) to output image data into a full-color domain. Demosaic operation may include low pass directional filtering on the interpolated samples to obtain full-color pixels. Per-pixel color correction operation refers to a process of performing color correction on a per-pixel basis using information about relative noise standard deviations of each color channel to correct color without amplifying noise in the image data. Gamma mapping refers to converting image data from input image data values to output data values to perform gamma correction. For the purpose of Gamma mapping, lookup tables (or other structures that index pixel values to another value) for different color components or channels of each pixel (e.g., a separate lookup table for R, G, and B color components) may be used. Color space conversion refers to converting color space of an input image data into a different format. In one embodiment, resample processing stage 308 converts RGB format into YCbCr format for further processing.

Central control module 320 may control and coordinate overall operation of other components in ISP 206. Central control module 320 performs operations including, but not limited to, monitoring various operating parameters (e.g., logging clock cycles, memory latency, quality of service, and state information), updating or managing control parameters for other components of ISP 206, and interfacing with sensor interface 302 to control the starting and stopping of other components of ISP 206. For example, central control module 320 may update programmable parameters for other components in ISP 206 while the other components are in an idle state. After updating the programmable parameters, central control module 320 may place these components of ISP 206 into a run state to perform one or more operations or tasks. Central control module 320 may also instruct other components of ISP 206 to store image data (e.g., by writing to system memory 230 in FIG. 2) before, during, or after resample processing stage 308. In this way full-resolution image data in raw or full-color domain format may be stored in addition to or instead of processing the image data output from resample processing stage 308 through backend pipeline stages 340.

Image statistics module 304 performs various operations to collect statistic information associated with the image data. The operations for collecting statistics information may include, but not limited to, sensor linearization, replace patterned defective pixels, sub-sample raw image data, detect and replace non-patterned defective pixels, black level compensation, lens shading correction, and inverse black level compensation. After performing one or more of such operations, statistics information such as 3A statistics (Auto white balance (AWB), auto exposure (AE), histograms (e.g., 2D color or component) and any other image data information may be collected or tracked. In some embodiments, certain pixels' values, or areas of pixel values may be excluded from collections of certain statistics data when preceding operations identify clipped pixels. Although only a single statistics module 304 is illustrated in FIG. 3, multiple image statistics modules may be included in ISP 206. For example, each image sensor 202 may correspond to an individual image statistics unit 304. In such embodiments, each statistic module may be programmed by central control module 320 to collect different information for the same or different image data.

Vision module 322 performs various operations to facilitate computer vision operations at CPU 208 such as facial detection in image data. The vision module 322 may perform various operations including pre-processing, global tone-mapping and Gamma correction, vision noise filtering, resizing, keypoint detection, generation of histogram-of-orientation gradients (HOG), and normalized cross correlation (NCC). The pre-processing may include subsampling or binning operation and computation of luminance if the input image data is not in YCrCb format. Global mapping and Gamma correction can be performed on the pre-processed data on luminance image. Vision noise filtering is performed to remove pixel defects and reduce noise present in the image data, and thereby, improve the quality and performance of subsequent computer vision algorithms. Such vision noise filtering may include detecting and fixing dots or defective pixels, and performing bilateral filtering to reduce noise by averaging neighbor pixels of similar brightness. Various vision algorithms use images of different sizes and scales. Resizing of an image is performed, for example, by binning or linear interpolation operation. Keypoints are locations within an image that are surrounded by image patches well suited to matching in other images of the same scene or object. Such keypoints are useful in image alignment, computing camera pose and object tracking. Keypoint detection refers to the process of identifying such keypoints in an image. HOG provides descriptions of image patches for tasks in mage analysis and computer vision. HOG can be generated, for example, by (i) computing horizontal and vertical gradients using a simple difference filter, (ii) computing gradient orientations and magnitudes from the horizontal and vertical gradients, and (iii) binning the gradient orientations. NCC is the process of computing spatial cross-correlation between a patch of image and a kernel.

Noise processing stage 310 performs various operations to reduce noise in the image data. The operations performed by noise processing stage 310 include, but are not limited to, color space conversion, gamma/de-gamma mapping, temporal filtering, noise filtering, luma sharpening, and chroma noise reduction. The color space conversion may convert an image data from one color space format to another color space format (e.g., RGB format converted to YCbCr format). Gamma/de-gamma operation converts image data from input image data values to output data values to perform gamma correction or reverse gamma correction. In some embodiments, the noise processing stage 310 comprises a temporal processing and fusion circuit 336 and a spatial processing circuit 338, configured to perform temporal filtering and spatial filtering, respectively, on received image data. Temporal filtering filters noise using a previously filtered image frame to reduce noise. For example, pixel values of a prior image frame are combined with pixel values of a current image frame. Noise filtering may include, for example, spatial noise filtering. Luma sharpening may sharpen luma values of pixel data while chroma suppression may attenuate chroma to gray (e.g., no color). In some embodiment, the luma sharpening and chroma suppression may be performed simultaneously with spatial nose filtering. The aggressiveness of noise filtering may be determined differently for different regions of an image. Spatial noise filtering may be included as part of a temporal loop implementing temporal filtering. For example, a previous image frame may be processed by a temporal filter and a spatial noise filter before being stored as a reference frame for a next image frame to be processed. For example, the noise processing stage 310 may perform image fusion by warping and fusing an image frame with a reference frame. In some embodiments, image fusion is performed using image pyramids of received image frames (e.g., generated by the pyramid generator circuit 332). In other embodiments, spatial noise filtering may not be included as part of the temporal loop for temporal filtering (e.g., the spatial noise filter is applied to an image frame after it is stored as a reference image frame and thus the reference frame is not spatially filtered).

Back-end interface 342 receives image data from other image sources than image sensor 102 and forwards it to other components of ISP 206 for processing. For example, image data may be received over a network connection and be stored in system memory 230. Back-end interface 342 retrieves the image data stored in system memory 230 and provides it to back-end pipeline stages 340 for processing. One of many operations that are performed by back-end interface 342 is converting the retrieved image data to a format that can be utilized by back-end processing stages 340. For instance, back-end interface 342 may convert RGB, YCbCr 4:2:0, or YCbCr 4:2:2 formatted image data into YCbCr 4:4:4 color format.

Back-end pipeline stages 340 processes image data according to a particular full-color format (e.g., YCbCr 4:4:4 or RGB). In some embodiments, components of the back-end pipeline stages 340 may convert image data to a particular full-color format before further processing. Back-end pipeline stages 340 may include, among other stages, noise processing stage 310 and color processing stage 312. Back-end pipeline stages 340 may include other stages not illustrated in FIG. 3.

Color processing stage 312 may perform various operations associated with adjusting color information in the image data. The operations performed in color processing stage 312 include, but are not limited to, local tone mapping, gain/offset/clip, color correction, three-dimensional color lookup, gamma conversion, and color space conversion. Local tone mapping refers to spatially varying local tone curves in order to provide more control when rendering an image. For instance, a two-dimensional grid of tone curves (which may be programmed by the central control module 320) may be bi-linearly interpolated such that smoothly varying tone curves are created across an image. In some embodiments, local tone mapping may also apply spatially varying and intensity varying color correction matrices, which may, for example, be used to make skies bluer while turning down blue in the shadows in an image. Digital gain/offset/clip may be provided for each color channel or component of image data. Color correction may apply a color correction transform matrix to image data. 3D color lookup may utilize a three dimensional array of color component output values (e.g., R, G, B) to perform advanced tone mapping, color space conversions, and other color transforms. Gamma conversion may be performed, for example, by mapping input image data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

Output rescale module 314 may resample, transform and correct distortion on the fly as the ISP 206 processes image data. Output rescale module 314 may compute a fractional input coordinate for each pixel and uses this fractional coordinate to interpolate an output pixel via a polyphase resampling filter. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 314 may apply transforms to image data as it is processed at output rescale module 314. Output rescale module 314 may include horizontal and vertical scaling components. The vertical portion of the design may implement series of image data line buffers to hold the "support" needed by the vertical filter. As ISP 206 may be a streaming device, it may be that only the lines of image data in a finite-length sliding window of lines are available for the filter to use. Once a line has been discarded to make room for a new incoming line, the line may be unavailable. Output rescale module 314 may statistically monitor computed input Y coordinates over previous lines and use it to compute an optimal set of lines to hold in the vertical support window. For each subsequent line, output rescale module may automatically generate a guess as to the center of the vertical support window. In some embodiments, output rescale module 314 may implement a table of piecewise perspective transforms encoded as digital difference analyzer (DDA) steppers to perform a per-pixel perspective transformation between a input image data and output image data in order to correct artifacts and motion caused by sensor motion during the capture of the image frame. Output rescale may provide image data via output interface 316 to various other components of device 100, as discussed above with regard to FIGS. 1 and 2.

In various embodiments, the functionally of components 302 through 350 may be performed in a different order than the order implied by the order of these functional units in the image processing pipeline illustrated in FIG. 3, or may be performed by different functional components than those illustrated in FIG. 3. Moreover, the various components as described in FIG. 3 may be embodied in various combinations of hardware, firmware or software.

Example Dynamic Buffers In ISP

Figure 4:
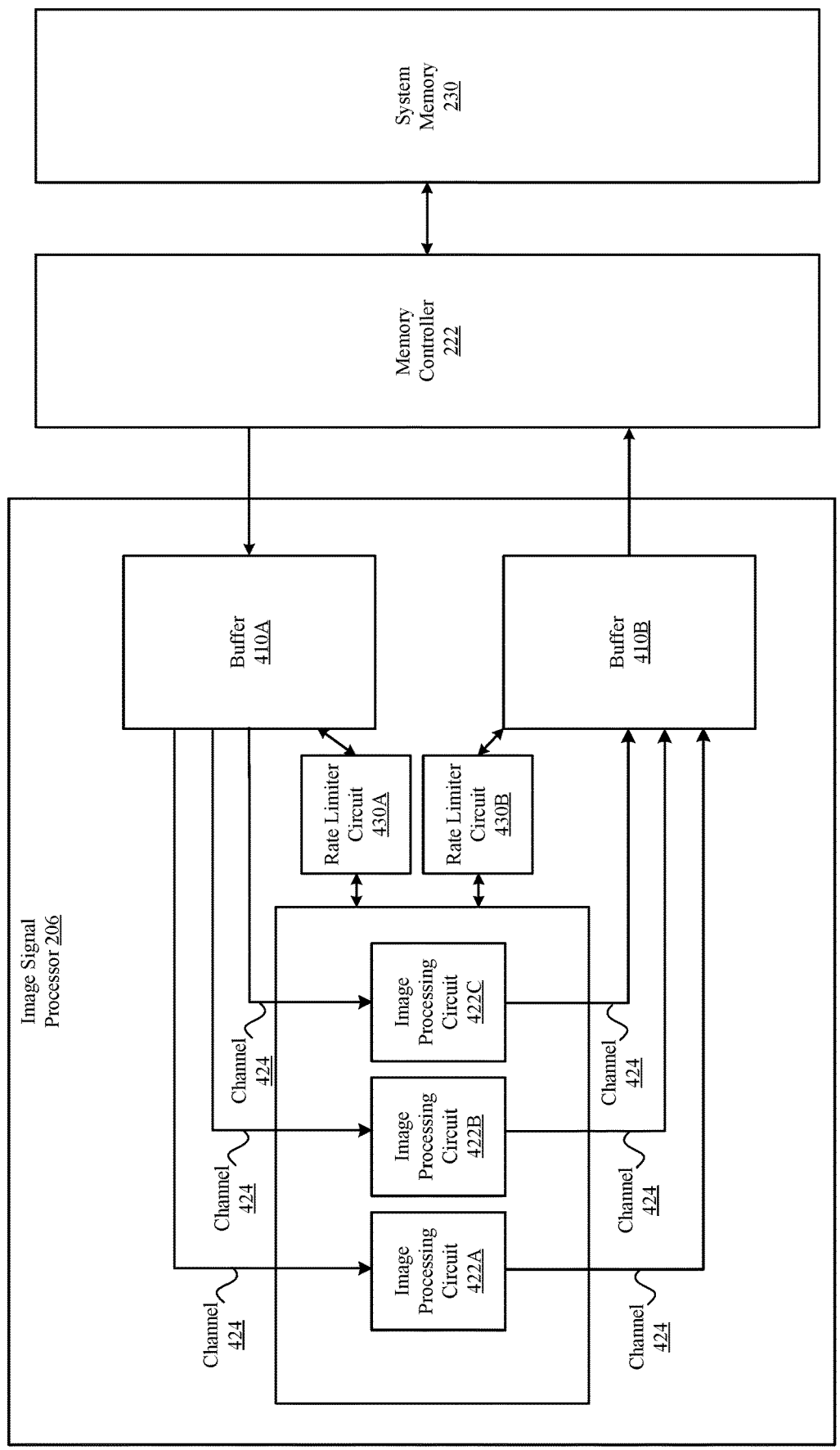
FIG. 4 is a block diagram illustrating an example image signal processor that uses dynamic buffering for multiple asynchronous pixel pipelines, according to an embodiment.

FIG. 4 is a block diagram illustrating an example processor that uses dynamic buffering for multiple asynchronous data processing pipelines, according to an embodiment. While in FIG. 4 image signal processor 206 and pixel pipelines are used as examples respectively for a processor and data processing pipelines, various features described in this disclosure, including methods and architecture described in FIG. 4 and other figures, may be applied to other types of processors and other data processing pipelines. For example, the dynamic load balancing data request and shared buffer allocation may be applied to any suitable processors according to the pipeline consumption and production of data. Without any loss of generality, the dynamic allocation of shared buffer is described using image signal processor 206 as an example.

Image signal processor 206 read various image data from system memory 230, process the image data, and write the data back to system memory 230. Multiple asynchronous image processing circuits, which may also be referred to as image processing circuits 422A, 422B, 422C, etc. (collectively referred to as image processing circuits 422 or individually image processing circuit 422), may process different image data and carry out various image processing activities simultaneously. An image processing circuit 422 may also be referred to as pixel pipeline 422. The data exchange traffic between image signal processor 206 and system memory 230 for various pixel pipelines 422 is merged through buffers 410A and 410B and memory controller 222. Image signal processor 206 may include buffers 410A and 410B, one or more image processing circuits 422, and rate limiter circuits 430A and 430B. Image signal processor 206 may include additional, fewer, or different components. For example, additional components and functionalities of image signal processor 206 are described in FIG. 3.

Image signal processor 206 includes a plurality of image processing circuits 422. An image processing circuits 422, which may also be referred to as pixel pipeline 422, may correspond to noise processing stage 310, front-end 330, or back-end 340 illustrated in FIG. 3 and performs one or more image processing activities. Pixel pipelines 422 may exchange image data with system memory 230. For example, image signal processing may include raw processing stage 306, resample processing stage 308, temporal processing fusion 336, spatial processing 338, color processing stage 312, output rescale 314, or another suitable image processing circuitry. The data traffic associated with a pixel pipeline 422 may be referred to as a channel 424 or a stream. For example, a pixel pipeline 422 may include a read direct memory access (DMA) or a write DMA.

Buffers 410A and 410B are memory that temporarily stores data that are fetched from system memory 230 or that are about to be written to system memory 230. Buffer 410A represents a read buffer and buffer 410B represents a write buffer. Unless otherwise specified, buffers 410A and 410B may be collectively referred to as buffers 410. Functionalities and operations of read buffer 410A are going to be discussed as examples in this disclosure. Similar principles may apply to write buffer 410B. A buffer 410 is coupled to pixel pipelines 422 and system memory 230. Buffer 410 stores image data for the exchanges between pixel pipelines 422 and system memory 230. Buffer 410 includes a shared section that is dynamically allocated among the plurality of pixel pipelines 422. Details of the dynamic sharing of buffer 410 are further discussed in FIGS. 5 and 6.

Buffer 410 is used to temporarily store image data that have not yet been consumed by a pixel pipeline 422 or written to system memory 230. For example, various pixel pipelines 422 may initiate requests to fetch image data from system memory 230. The fetched image data are temporarily stored in read buffer 410A until the requestor pixel pipeline 422 sends a buffer data request and consumes the image data. In turn, pixel pipelines 422 perform image processing activities and send outputs to write buffer 410B. The outputs are temporarily stored in write buffer 410B until the outputs are written to system memory 230. Each buffer 410 is dynamically shared by multiple pixel pipelines 422. Buffer 410 includes a shared section that is dynamically allocated among the pixel pipelines 422.

The dynamic allocation of the shared section of a buffer 410 is controlled by a rate limiter circuit 430A or 430B (collectively referred to rate limiter circuits 430 or a rate limiter circuit 430). A rate limiter circuit 430 is coupled to the one or more image processing circuits 422. A rate limiter circuit 430 performs arbitration of allocation of the shared section among the pixel pipelines 422. In one embodiment, rate limiter circuit 430 may exponentially reduce the request rate of a pixel pipeline 422 based on the amount of pending and valid data of the pixel pipeline 422 in buffer 410. The reduction of request rate results in a throttling of a pixel pipeline 422 if the space in buffer 410 occupied by the particular pixel pipeline 422 exceeds a threshold. An example of the operation of a rate limiter circuit 430 is further discussed in FIG. 6.

Example Shared and Private Sections in a Dynamic Buffer

Figure 5:
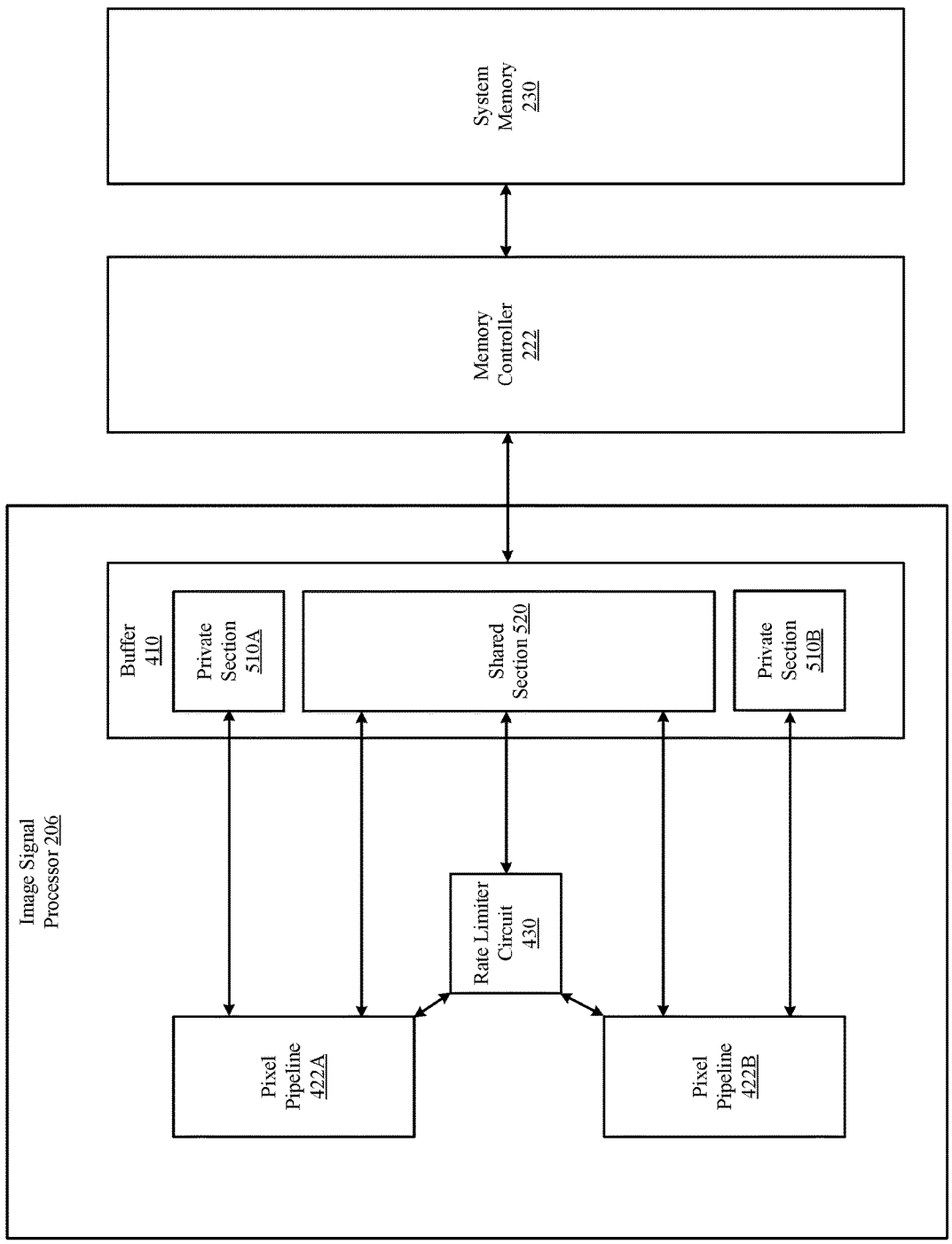
FIG. 5 is a block diagram of an image signal processor illustrating the shared section and fixed private sections of a buffer, according to an embodiment.

FIG. 5 is a block diagram of an image signal processor 206 illustrating the shared section and fixed private sections of a buffer 410, according to an embodiment. FIG. 5 illustrates how the bandwidth of buffer 410 is allocated among a plurality of pixel pipelines 422. In FIG. 5, only two pixel pipelines 422A and 422B are shown, while in various embodiments additional pixel pipelines 422 may share the same buffer 410. Again, similar to FIG. 4, various features related to the architecture and operating principles of buffer 410 may also be applied to any suitable processors other than image signal processors.

In one embodiment, buffer 410 is divided into sections that include a plurality of private sections 510A, 510B, etc. (collectively as private sections 510) and a shared section 520. Each pixel pipeline 422 is allocated with a corresponding private section 510. In one embodiment, the size of the private section 510 reserved for a pixel pipeline 422 is fixed. For example, each pixel pipeline 422 has a reserved minimum private section 510 that is sufficient for one data stream request. The plurality of pixel pipelines 422 also have access to the shared section 520 that is dynamically shared among the pipelines. A pixel pipeline 422 is reserved for minimal access to the system memory 230 through its corresponding private section 510 and can expand the access bandwidth through the use of the shared section 520. For example, in one embodiment, buffer 410 may be divided into blocks of 64 bytes and includes a number of blocks such as 512 blocks. Each private section 510 has a size of one block, which is sufficient for a data request. The rest of buffer 410 is used as the shared section 520. The reservation of a private section 510 for each pixel pipeline 422 may help to promote forward progress and avoid deadlock of a particular pixel pipeline 422 by ensuring the particular pixel pipeline 422 can at least have access to system memory 230 even if the particular pixel pipeline 422 is not allocated with any blocks in the shared section 520.

The plurality of pixel pipelines 422 are coupled to a rate limiter circuit 430 that performs arbitration of allocation of the shared section 520 among the pixel pipelines 422. While in FIG. 5 the rate limiter circuit 430 is illustrated as a single block, in some embodiments each pixel pipeline 422 may be connected to independent rate limiter circuitry. In one embodiment, rate limiter circuit 430 uses a hardware-based management architecture. Rate limiter circuit 430 monitors the bytes per clock rate of a pixel pipeline 422. Rate limiter circuit 430 throttles, such as by exponential reduction, the request rate of a pixel pipeline 422 based on the amount of pending and valid data of the pixel pipeline 422 used in the shared section 520. This sets up a hardware-based control loop that balances the latency tolerance of the pixel pipelines 422 dynamically based on the activities of those pixel pipelines 422. The hardware-based control loop has a quicker response time to system events, resulting in improved buffer utilization and smaller buffer sizes. Under high memory system stress and latencies, the architecture illustrated in FIG. 5 provides a graceful and uniform frame performance.

According to an embodiment, the arbitration performed by rate limiter circuit 430 may be a credit allocation process that is based on pending requests of a particular pixel pipeline 422 and the data pending to be consumed by the particular pixel pipeline 422. By way of example, rate limiter circuit 430 may allocate request credits for the shared section 520 to a particular pixel pipeline 422 in response to the particular pixel pipeline 422 initiating an exchange with the system memory 230. Rate limiter circuit 430 may continue to increase the allocation. Rate limiter circuit 430 may determine a first number of blocks in the shared section 520 that are allocated for pending requests sent by the particular pixel pipeline 422 using the request credits. Rate limiter circuit 430 may also determine a second number of blocks in the shared section 520 that include data pending to be consumed by the particular pixel pipeline. Rate limiter circuit 430 may determine the total number of blocks occupied by the particular pixel pipeline 422 exceeding a throttling threshold. In one embodiment, the total number of blocks is at least the sum of the first and second numbers of blocks. Rate limiter circuit 430 may reduce additional allocation of the request credits to the particular pixel pipeline 422 for at least a duration in which the total number of blocks occupied by the particular pixel pipeline 422 exceeding the throttling threshold. In one embodiment, the additional allocation of the request credits to the particular pixel pipeline 422 may be reduced by an exponential factor for at least the duration in which the total number of blocks occupied by the pixel pipeline exceeds the throttling threshold.

Example Buffer Arbitration

Figure 6:
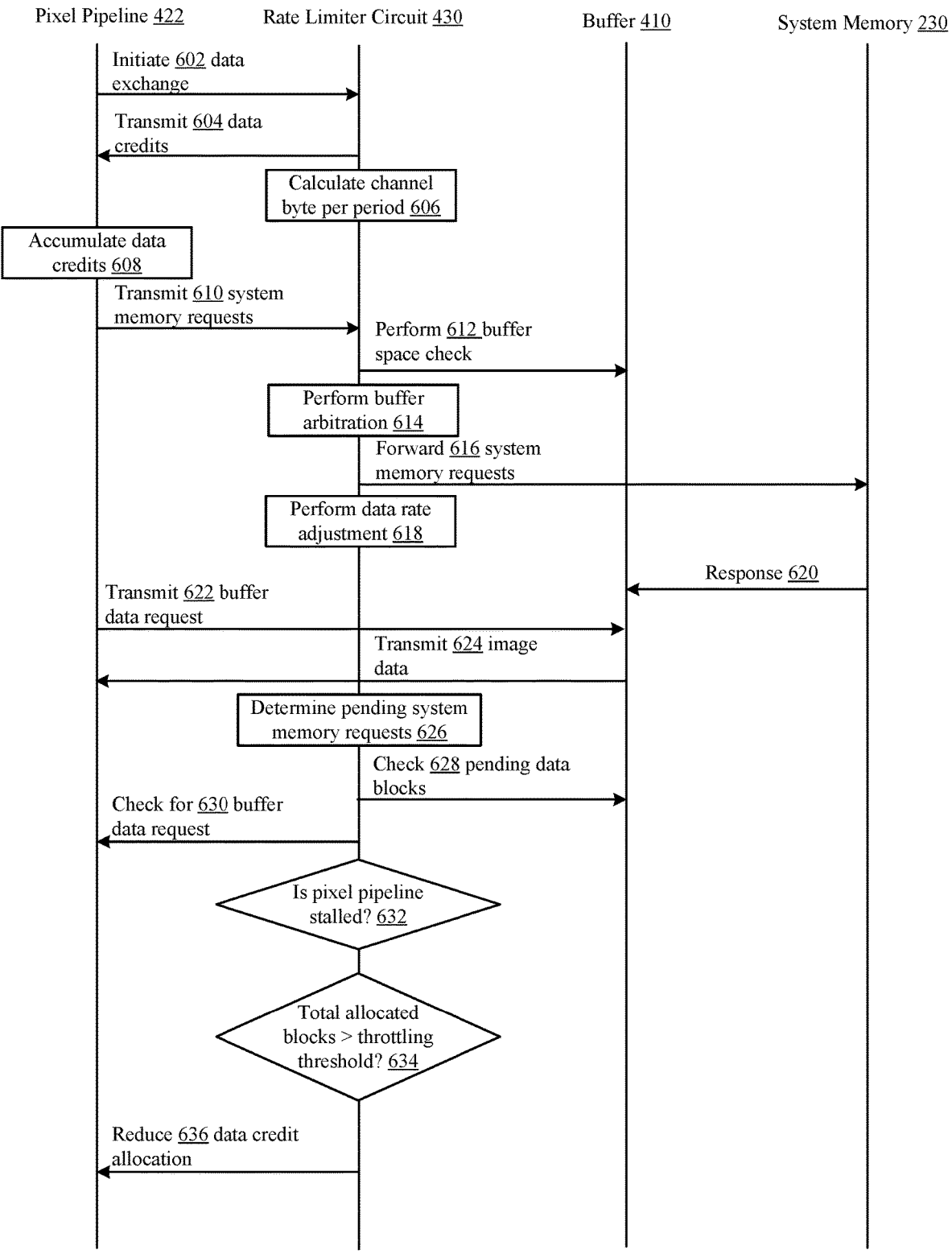
FIG. 6 is a flowchart depicting an example buffer arbitration process performed by a rate limiter circuit, according to an embodiment.

FIG. 6 is a flowchart depicting an example buffer arbitration process performed by rate limiter circuit 430, according to an embodiment. The rate limiter circuit 430 can be used in any suitable processor and the components of image signal processor 206 are used as examples only. In one embodiment, rate limiter circuit 430 includes circuitry to perform a rate limiting algorithm to control the allocation of blocks in shared section 520 of buffer 410 among the plurality of pixel pipelines 422. By way of example, the rate limiter circuit 430 controls the rate at which pixel pipelines 422 are allowed to send requests to system memory 230. Rate limiter circuit 430 receives system memory requests and associated fields (data address, data length, etc.) from a pixel pipeline 422. The system memory requests may be individually gated by the rate limiting algorithm, with one instance dedicated to each pixel pipeline 422. The gated system memory requests are passed along to the rate limiter circuit 430. Other request fields are passed along unchanged.

When a particular pixel pipeline 422 starts up and initiates 602 data exchange, rate limiter circuit 430 transmits 604 a number of data credits to the pixel pipeline, which may also be referred to as byte credits. In one embodiment, the byte credits may be calculated by the maximum burst size per system memory request multiple by the block size of buffer 410. The maximum burst size indicates the pixel pipeline's maximum number of buffer blocks per system memory request. For example, the maximum burst size can be 1, 2, 4, or 8 blocks per system memory request and the block size of buffer 410 may be in 64 bytes. The initial reception of data credits allows the pixel pipeline 422 to make at least one system memory request, regardless of other shared buffer usage. The pixel pipeline 422 calculates its expected bytes per evaluation period (e.g., clock period or every several clock periods) and sends this value to rate limiter circuit 430, which scales up the value to calculate 606 the initial channel byte per period, which is the initial traffic allocation to the pixel pipeline 422. Rate limiter circuit 430 may include a register, which may be referred to as a credit-scale register, to store the scaling up of the channel byte per period for a particular pixel pipeline 422. Rate limiter circuit 430 uses the initial channel byte per period value to initialize the current channel byte per period. After a pixel pipeline 422 makes its first buffer data request, the pixel pipeline 422 starts to accumulate 608 byte credits. Until a pixel pipeline 422 has received its first response indicating data is available in buffer 410, the pixel pipeline 422 is considered to be in the ramp-up state. In one embodiment, during the ramp-up date, rate limiter circuit 430 ignores the data rate, stall, and occupancy limit checks.

A pixel pipeline 422 transmits 610 system memory requests to rate limiter circuit 430 and to system memory 230 based on available data credits. Rate limiter circuit 430 may perform 612 a dynamic buffer space check. Incoming system memory requests from the pixel pipeline 422 are compared first against the corresponding allocated private section 510. If the space for the request is available in the private section 510, the system memory request will be permitted. Otherwise, rate limiter circuit 430 checks for space in the shared section 520 and against the maximum buffer space allocation for a particular pixel pipeline 422. Rate limiter circuit 430 may include registers for storing the maximum buffer space allocation for each pixel pipeline 422. If space is available in both the shared section 520 and in the maximum allocation, the system memory request is allowed to proceed. Otherwise, the system memory request is rejected.

Rate limiter circuit 430 may perform credit allocation in every evaluation period. In an evaluation period, each active pixel pipeline 422 receives byte credits equal to the current channel byte per period. If buffer space is available as determined in the previous step 612, system memory requests from the pixel pipelines 422 are compared to the accumulated byte credit counts. If the requested data size (e.g., in bytes) is less than or equal to the number of credits, the system memory requests are passed on to arbitration 614 and may be forwarded 616 to system memory 230. Otherwise, the request is blocked. When the system memory request is acknowledged by the arbiter, the request size is subtracted from the credit count. Rate limiter circuit 430 may in turn calculate the new credit count. When calculating the new credit count, rate limiter circuit 430 may subtract the outgoing request from the credit count. The subtraction may saturate to 0 (the request size may exceed the credit count if the request fits within a pixel pipeline's private section allocation). The new credits from the current channel byte per period are added in, saturating to the maximum credit in bytes. For example, the maximum credit bytes may be calculated by the maximum credits that can be accumulated by a single pixel pipeline multiplied by buffer block size. The allocated block count of a pixel pipeline 422 is also increased by the size of the request (e.g., in blocks).

Rate limiter circuit 430 may also perform 618 a data rate adjustment. For example, in some cases, the initial bandwidth calculation may be too aggressive. A pixel pipeline 422 may have sporadic usage, such as having other side pixel pipelines 422 feeding non-pixel data to a pipe. Some pixel pipelines 422 may also have reduced bandwidth due to structural configuration, such as a 4 pixel-per-clock (ppc) pixel pipeline 422 connected to a 2ppc pipe. To adjust for such cases, rate limiter circuit 430 tracks the number of buffer data requests seen by each pixel pipeline 422 over an evaluation period and determines a data consumption rate in bytes per evaluation period. In one embodiment, the data rate may be calculated as the buffer data request count multiplied by buffer block size divided by the evaluation period. If the data consumption differs from current channel bytes per period, then the current channel bytes per period is adjusted in the same direction. The amount of adjustment depends on the current allocation and is specified in the buffer data request adjustment amount. In one embodiment, the current channel bytes per period cannot go below 1 or above initial channel bytes per period.

Rate limiter circuit 430 performs occupancy-based throttling, according to an embodiment. The occupancy-based throttling prevents higher-bandwidth pixel pipelines 422 from being allocated excessive amounts of shared buffer space. Rate limiter circuit 430 may first determine the total allocated blocks occupied by a pixel pipeline 422. The total allocated blocks occupied by a pixel pipeline 422 may include a first number of blocks in the shared section 520 that are allocated for pending requests sent by the pixel pipeline 422 using the data credits. Rate limiter circuit 430 determines 626 pending system memory requests, which are blocks that have not received a response from system memory 230. The total allocated blocks occupied by a pixel pipeline 422 may also include a second number of blocks that are available in the shared section 520 but not yet consumed by the pixel pipeline 422. For example, after system memory 230 provides a response 620, the image data is fetched to buffer 410. Pixel pipeline 422 may transmit 622 a buffer data request to buffer 410 to fetch the image data. In response, buffer 410 transmits 624 the image data. However, in some cases, pixel pipeline 422 does not transmit 622 a buffer data request. As such, buffer 410 receives a response from system memory 230 but has not yet received a buffer data request from the pixel pipeline 422 so that the data are pending to be consumed by the pixel pipeline 422. Rate limiter circuit 430 checks 628 with buffer 410 for the pending data blocks. Rate limiter circuit 430 determines the total allocated blocks occupied by a pixel pipeline 422. For example, the total allocated block count is incremented by the request size in blocks when the requests are sent to system memory 230 and decremented when the pixel pipeline 422 sends a buffer data request.

In some embodiments, rate limiter circuit 430 may also detect stalled pixel pipelines 422. By way of example, some pixel pipelines 422 may exhibit bursty behavior, where the pixel pipelines 422 alternate between running at the expected data rate or being blocked by the pipe. Examples include (1) chroma pixel pipelines in 4:2:0 formats, where during odd frame rows the pipe is consuming luma data only, (2) quadra PLA pixel pipelines, where the pipe alternates between pixel pipeline pairs every two lines, and (3) pyramid inputs, where the pipe switches processing between pyramid levels and consumes data from only one level at a time.

Rate limiter circuit 430 detects those bursty cases by checking for 628 buffer data requests. If a particular pixel pipeline 422 has data available in buffer 410 but no buffer data request is seen by rate limiter circuit 430 during an entire evaluation period, rate limiter circuit 430 may consider 632 whether the particular pixel pipeline 422 to be stalled. For example, rate limiter circuit 430 may determine the number of blocks in shared section 520 that include data pending to be consumed by a pixel pipeline 422 is larger than zero. Rate limiter circuit 430 may detect that the pixel pipeline 422 has stopped sending a buffer data request to buffer 410. As such, the pixel pipeline 422 is determined to be stalled. Rate limiter circuit 430 may stop temporarily allocating data credits to the stalled pixel pipeline 422. The stalled pixel pipeline 422 does not receive a data credit allocation while in this state. After a pixel pipeline 422 sends a buffer data request to buffer 410, the stalled state is cleared and credit allocation resumes. The initial period between the first system memory request and the first system memory response is considered to be the ramp-up state. In one embodiment, the stalled check is not performed while in this state.

Rate limiter circuit 430 may also perform starvation detection. Starvation may occur when a pixel pipeline 422 stalls the pipe interface. When this condition is detected, the current channel byte per period is reset to the initial channel byte per period. For example, any downward adjustment in credit allocation is removed. This check may occur in the normal run state, not the stalled or throttling states. If a stall or a throttle condition is detected in the same cycle, as the data starvation condition is detected, the stall or throttle takes precedence.

Rate limiter circuit 630 determines 634 whether the total allocated blocks exceed a throttling threshold, which may be referred to as a backoff threshold (e.g., measured in a number of blocks). If a particular pixel pipeline 422 has been allocated more than the throttling threshold, rate limiter circuit 430 will perform a throttling operation. The throttling operation includes reducing 636 the credit allocation to the particular pixel pipeline 422. In one embodiment, an exponential reduction may be used. For example, the credit allocation to the particular pixel pipeline 422 is immediately halved (e.g., current channel bytes per period is divided by 2). At the end of every evaluation period where the credit allocation to a pixel pipeline 422 is still above the backoff threshold, current channel bytes per period is halved again, down to a minimum of 1 byte per evaluation period. This reduction process may take priority over the normal data rate adjustment.

In the process of throttling, rate limiter circuit 430 may check for the stall conditions before resuming the traffic of the pixel pipeline 422. For example, during the period when the total allocated blocks of the pixel pipeline 422 are greater than or equal to a second threshold, which may be referred to as a restore threshold that is lower than the backoff threshold, rate limiter circuit 430 checks the stall condition as described above. In one embodiment, during this stage, rate limiter circuit 430 does not check for pipe starvation because the pixel pipeline 422 has sufficient requests outstanding to service the pipe. In response to the total allocated blocks of a pixel pipeline 422 dropping below the restore threshold, the credit allocation is returned to the original amount, such as the initial channel byte per period. If a stall condition is detected at a pixel pipeline 422 in the same cycle as the throttling condition is detected, rate limiter circuit 430 may determine that the stall takes priority and throttling will not occur until the stalled state is cleared. If the stalled condition is detected while in the throttling process (e.g., one or more cycles after the initial throttling but before the restore condition is reached), the pixel pipeline 422 will be considered to be both stalled and throttled. Credit accumulation and further throttling are both suspended until the stalled state is cleared, at which point the pixel pipeline 422 returns to the throttling state. This allows the initial credit allocation to be restored correctly if a stall condition occurs while throttling.

Example Shared Dynamic Buffer Operation

Figure 7:
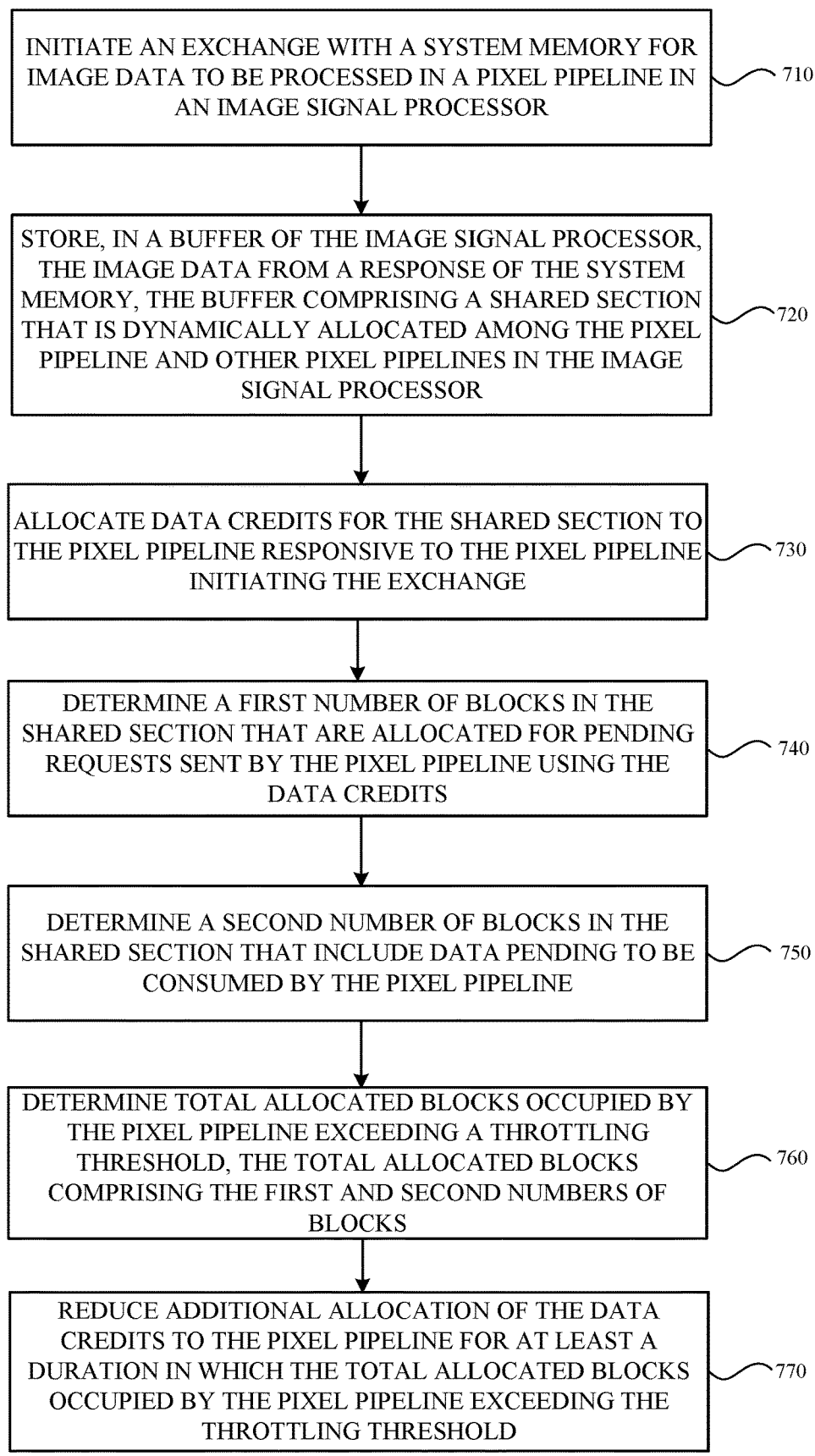
FIG. 7 is a flowchart depicting an example process for performing dynamic buffer sharing in an image signal processor, according to an embodiment.

FIG. 7 is a flowchart depicting an example process for performing dynamic buffer sharing in a processor, according to an embodiment. The process may be performed by various components in a processor. Again, image signal processor 206 is used as an example of the processor, but other types of processors may also use the same dynamic buffer sharing process in various embodiments. An image signal processor 206 may include one or more processing circuits that include a plurality of pixel pipelines 422 that exchange image data with system memory 230 and process the image data. Image signal processor 206 may also include a buffer 410 coupled to the image processing circuits and the system memory. The buffer stores the image data for the exchanges between the pixel pipelines 422 and system memory 230. Buffer 410 includes a shared section that is dynamically allocated among the plurality of pixel pipelines 422. Image signal processor 206 may also include a rate limiter circuit 430 that performs arbitration of allocation of the shared section among the pixel pipelines 422.

In one embodiment, image signal processor 206 may initiate 710 an exchange with system memory 230 for image data to be processed in one of the pixel pipelines 422. A pixel pipeline 422 may correspond to raw processing stage 306, resample processing stage 308, temporal processing fusion 336, spatial processing 338, color processing stage 312, output rescale 314, or another suitable image processing circuitry. The exchange of image data with system memory 230 may be reading of image data from system memory 230 or writing of image data. For example, pixel pipeline 422 may include a read DMA or a write DMA.

Image signal processor 206 may store 720, in buffer 410, the image data from a response of the system memory 230. For example, a pixel pipeline 422 may form a stream with system memory 230 to fetch an image. The image may be divided into pixels that are packed as data blocks that are stored in system memory 230. The pixel pipeline 422 may send an address request for the data blocks. In turn, system memory 230 provides one or more data blocks as a response to the request. The buffer 410 includes a shared section 520 that is dynamically allocated among the pixel pipeline and other pixel pipelines in the image signal processor 206. The data blocks or at least part of the data blocks may be temporarily stored in the shared section 520. In one embodiment, buffer 410 also includes a private section for the pixel pipeline 422. Part of the image data that is from the response of system memory 230 may also be stored in the private section.

Image signal processor 206 may allocate 730 data credits for the shared section 520 to the pixel pipeline 422 responsive to the pixel pipeline 422 initiating the exchange with system memory 230. In one embodiment, a data credit allows the pixel pipeline 422 to request to exchange a fixed size of data with the system memory 230. For example, a data credit may correspond to a fixed block size such as 64 bytes. In other embodiments, other sizes may also be used, whether the block size is fixed or not. In one embodiment, to ramp up the data processing of the pixel pipeline 422, an allocation rate of the data credits to the pixel pipeline 422 may be increased until the pixel pipeline 422 is stalled or until the total allocated blocks occupied by the pixel pipeline 422 exceeding a throttling threshold.

Image signal processor 206 may determine 740 a first number of blocks in the shared section 520 that are allocated for pending requests sent by the pixel pipeline 422 using the data credits. The requests are sent to system memory 230 such as address requests. Buffer 410 waits for the responses from system memory 230 for the pending requests and allocates blocks corresponding to the size of the requests for the pixel pipelines 422. The blocks in the shared section 520 reserved for pending requests are considered to be allocated for the pixel pipeline 422.

Image signal processor 206 may determine 750 a second number of blocks in the shared section 520 that include data pending to be consumed by the pixel pipeline 422. After requests are sent to system memory 230, system memory 230 provides responses to buffer 410. In turn, buffer 410 temporarily store the image data from the responses of system memory 230. The image data is pending for consumption by the pixel pipeline 422. The pixel pipeline 422 may send buffer data requests to consume the image data stored in buffer 410. However, in some cases, the pixel pipeline 422 may also be stalled. In response to detecting that the pixel pipeline 422 has been stalled, rate limiter circuit 430 may stop temporarily allocating additional data credits to the pixel pipeline. Detecting the stall condition may include determining that the second number of blocks in the shared section 520 that include data pending to be consumed by the pixel pipeline 422 is larger than zero and detecting that the pixel pipeline 422 has stopped sending a buffer data request to the buffer 410.

Image signal processor 206 may determine 760 total allocated blocks occupied by the pixel pipeline exceeding a throttling threshold. The total allocated blocks include the first numbers of blocks and second numbers of blocks. In one embodiment, the total allocated blocks occupied by a pixel pipeline 422 is incremented by the request size in blocks when the requests are sent to system memory 230 and decremented when the pixel pipeline 422 sends a buffer data request.

Image signal processor 206 may reduce 770 or prevent allocations of additional data credits to the pixel pipeline 422 for at least a duration in which the total allocated blocks occupied by the pixel pipeline 422 exceed the throttling threshold. In one embodiment, the additional allocation of the data credits to the pixel pipeline 422 is reduced by an exponential factor for at least the duration in which the total allocated blocks occupied by the pixel pipeline 422 exceed the throttling threshold. In one embodiment, the additional allocation of the data credits is reduced until the total allocated blocks occupied by the pixel pipeline 422 is below a restoration threshold.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. An image signal processor, comprising:
   image processing circuits configured to perform operations associated with image signal processing;
   a buffer configured to buffer data between the image processing circuits and a system memory, the buffer comprising a shared section dynamically allocated among the image processing circuits; and
   a rate limiter circuit coupled to the image processing circuits, the rate limiter circuit configured to arbitrate allocation of the shared section among the image processing circuits, wherein arbitrating the allocation of the shared section comprises:
   allocating a number of data credits for the shared section to one of the image processing circuits;
   determining total allocated blocks for the shared section allocated to the one of the image processing circuits, the total allocated blocks comprising a first number of blocks allocated for pending requests made by the one of the image processing circuits that have not received a response from the system memory, and a second number of blocks storing data received from the system memory and pending to be consumed by the one of the image processing circuits; and
   reducing or preventing allocation of additional data credits separated from the number of data credits already allocated to the one of the image processing circuits for at least a duration in which the total allocated blocks occupied by the one of the image processing circuits exceed a throttling threshold responsive to determining that the total allocated blocks exceed the throttling threshold.

2. The image signal processor of claim 1, wherein the allocation of the additional data credits to the one of the image processing circuits is reduced by an exponential factor for at least the duration in which the total allocated blocks occupied by the one of the image processing circuits exceed the throttling threshold.

3. The image signal processor of claim 1, wherein at least one of the image processing circuits coupled to the buffer is allocated for a fixed private section of the buffer.

4. The image signal processor of claim 3, wherein the fixed private section is configured to allow the at least one of the image processing circuits to send at least one pending request.

5. The image signal processor of claim 1, wherein the image processing circuits include a plurality of read direct memory access (DMA) circuits or a plurality of write DMA circuits.

6. The image signal processor of claim 1, wherein arbitrating the allocation of the shared section further comprises:
   detecting that the one of the image processing circuits has been stalled; and
   stopping temporarily allocating additional data credits to the one of the image processing circuits.

7. The image signal processor of claim 6, wherein detecting that the one of the image processing circuits has been stalled comprises:
   determining the second number of blocks in the shared section that include data pending to be consumed by the one of the image processing circuits is larger than zero; and
   detecting that the one of the image processing circuits has stopped sending buffer data requests to the buffer.

8. The image signal processor of claim 1, wherein the allocation of the additional data credits is reduced until the total allocated blocks occupied by the one of the image processing circuits is below a restoration threshold.

9. The image signal processor of claim 1, wherein an allocation rate of the data credits to the one of the image processing circuits increases until the one of the image processing circuits is stalled or until the total allocated blocks occupied by the one of the image processing circuits exceed the throttling threshold.

10. The image signal processor of claim 1, wherein each data credit allows the one of the image processing circuits to request to exchange a fixed size of data with the system memory.

11. A method comprising:
    initiating an exchange with a system memory for image data to be processed in an image processing circuit of an image signal processor;
    storing, in a buffer of the image signal processor, the image data from a response of the system memory, the buffer comprising a shared section dynamically allocated among the image processing circuit and other image processing circuits in the image signal processor;
    allocating a number of data credits for the shared section to the image processing circuit;
    determining total allocated blocks for the shared section to the image processing circuit, the total allocated blocks comprising a first number of blocks allocated for pending requests made by the image processing circuit that have not received a response from the system memory, and a second number of blocks storing data received from the system memory and pending to be consumed by the image processing circuit; and
    reducing or preventing allocation of additional data credits separated from the number of data credits already allocated to the image processing circuit for at least a duration in which the total allocated blocks occupied by the one of the image processing circuits exceed a throttling threshold responsive to determining that the total allocated blocks exceed the throttling threshold.

12. The method of claim 11, wherein the allocation of the additional data credits to the image processing circuit is reduced by an exponential factor for at least the duration in which the total allocated blocks occupied by the image processing circuit exceed the throttling threshold.

13. The method of claim 11, wherein the image processing circuit is allocated for a fixed private section of the buffer.

14. The method of claim 13, wherein the fixed private section is configured to allow the image processing circuit to send at least one pending request.

15. The method of claim 11, further comprising:
    detecting that the image processing circuit has been stalled; and
    stopping temporarily allocating additional data credits to the image processing circuit.

16. The method of claim 15, wherein detecting that the image processing circuit has been stalled comprises:
- determining the second number of blocks in the shared section that include data pending to be consumed by the image processing circuit is larger than zero; and
- detecting that the image processing circuit has stopped sending buffer data requests to the buffer.

17. The method of claim 11, wherein the allocation of the additional data credits is reduced until the total allocated blocks occupied by the image processing circuit is below a restoration threshold.

18. The method of claim 11, wherein an allocation rate of the data credits to the image processing circuit increases until the image processing circuit is stalled or until the total allocated blocks occupied by the image processing circuit exceed the throttling threshold.

19. A computing device, comprising:
- an image sensor configured to capture image data;
- a system memory coupled to the image sensor, the system memory configured to store the image data; and
- an image signal processor coupled to the system memory, the image signal processor configured to:
  - initiate an exchange with the system memory for the image data to be processed in an image processing circuit in the image signal processor;
  - store, in a buffer of the image signal processor, the image data from a response of the system memory, the buffer comprising a shared section dynamically allocated among the image processing circuit and other image processing circuits in the image signal processor;
  - allocate a number of data credits for the shared section to the image processing circuit;
  - determine total allocated blocks for the shared section to the image processing circuit, the total allocated blocks comprising a first number of blocks allocated for pending requests made by the image processing circuit that have not received a response from the system memory, and a second number of blocks storing data received from the system memory and pending to be consumed by the image processing circuit; and
  - reduce or prevent allocation of additional data credits separated from the number of data credits already allocated to the image processing circuit for at least a duration in which the total allocated blocks occupied by the one of the image processing circuits exceed a throttling threshold responsive to determining that the total allocated blocks exceed the throttling threshold.

20. The computing device of claim 19, wherein the allocation of the additional data credits to the image processing circuit is reduced by an exponential factor for at least the duration in which the total allocated blocks occupied by the image processing circuit exceed the throttling threshold.

* * * * *

UNITED STATES PATENT AND TRADEMARK OFFICE
CERTIFICATE OF CORRECTION

| | | |
|---|---|---|
| PATENT NO. | : 12,462,323 B2 | Page 1 of 1 |
| APPLICATION NO. | : 17/694670 | |
| DATED | : November 4, 2025 | |
| INVENTOR(S) | : Subramanian et al. | |

It is certified that error appears in the above-identified patent and that said Letters Patent is hereby corrected as shown below:

On the Title Page

Column 1, Item (72), in "Inventors", Line 2, delete "W" and insert -- W. --, therefor.

Column 1, Item (72), in "Inventors", Line 3, delete "A" and insert -- A. --, therefor.

Column 1, Item (72), in "Inventors", Line 4, delete "C" and insert -- C. --, therefor.

Column 1, Item (72), in "Inventors", Line 5, delete "S" and insert -- S. --, therefor.

Column 1, Item (72), in "Inventors", Line 6, delete "L" and insert -- L. --, therefor.

Column 1, below "Item (72)", insert -- (73) Assignee: Apple Inc., Cupertino, CA (US) --, therefor.

Column 2, below "Primary Examiner", insert -- (74) Attorney, Agent, or Firm - Sterne, Kessler, Goldstein & Fox P.L.L.C. --, therefor.

Column 2, Item (57), under "ABSTRACT", Line 6, delete "shared" and insert -- shared section --, therefor.

Signed and Sealed this
Twenty-third Day of December, 2025

John A. Squires
*Director of the United States Patent and Trademark Office*